(12) United States Patent
Hassett et al.

(10) Patent No.: US 8,283,818 B2
(45) Date of Patent: Oct. 9, 2012

(54) ELECTRIC MOTOR WITH HEAT PIPES

(75) Inventors: Timothy Hassett, Santa Rosa, CA (US); Mark Hodowanec, Leesburg, VA (US)

(73) Assignee: HPEV, Inc., Wesley Chapel, FL (US)

( * ) Notice: Subject to any disclaimer, the term of this patent is extended or adjusted under 35 U.S.C. 154(b) by 532 days.

(21) Appl. No.: 12/533,236

(22) Filed: Jul. 31, 2009

(65) Prior Publication Data

US 2010/0026108 A1 Feb. 4, 2010

Related U.S. Application Data

(63) Continuation-in-part of application No. 11/765,140, filed on Jun. 19, 2007, now Pat. No. 7,569,955.

(60) Provisional application No. 60/805,192, filed on Jun. 19, 2006.

(51) Int. Cl.
*H02K 9/00* (2006.01)

(52) U.S. Cl. ............ 310/60 R; 310/52; 310/58; 310/64; 310/418

(58) Field of Classification Search .................... 310/52, 310/54, 57, 58, 60 R–63, 64, 88, 216, 254, 310/261, 418; 417/367, 423.8
See application file for complete search history.

(56) References Cited

U.S. PATENT DOCUMENTS

| | | | |
|---|---|---|---|
| 2,556,435 A | 6/1951 | Moehri et al. | |
| 3,715,610 A | 2/1973 | Brinkman | |
| 3,765,480 A | 10/1973 | Fries | |
| 3,801,843 A | 4/1974 | Corman et al. | |
| 4,118,646 A | 10/1978 | Fleming et al. | |
| 4,217,513 A | 8/1980 | Kohzai et al. | |
| 4,270,064 A | 5/1981 | Glandorf et al. | |
| 4,322,646 A | 3/1982 | Persson | |
| 4,406,959 A | 9/1983 | Harano et al. | |
| 4,574,210 A | 3/1986 | Wieland | |
| 4,685,867 A | 8/1987 | Patun et al. | |
| 4,745,320 A | 5/1988 | Oyama et al. | |
| 5,140,204 A | 8/1992 | Cashmore et al. | |
| 5,220,978 A | 6/1993 | McMaster | |
| 5,223,757 A | 6/1993 | Staub et al. | |
| 5,394,040 A | 2/1995 | Khanh | |

(Continued)

FOREIGN PATENT DOCUMENTS

GB 1489772 10/1977

(Continued)

*Primary Examiner* — Quyen Leung
*Assistant Examiner* — David Scheuermann
(74) *Attorney, Agent, or Firm* — Polster, Lieder, Woodruff & Lucchesi, L.C.

(57) ABSTRACT

A motor that includes a motor portion structured to house a stator and a rotor mounted to a shaft of the motor. The motor additionally includes a cooling portion disposed adjacent to the motor portion and separated from the motor portion by a structural interface. The cooling portion provides a cooling chamber structured to have a cooling fluid passed therethrough via a cooling fluid moving device that is structured to be coupled to and driven by the motor shaft. Furthermore, the motor includes a plurality of heat pipes having evaporator ends disposed within the motor portion and condenser ends disposed within the cooling chamber. During operation of the motor and cooling fluid moving device, the cooling fluid contacts the heat pipe condenser ends to extract heat from the condenser ends, hence cooling the evaporator ends of the heat pipes, thereby cooling the motor portion of the motor and the stator and rotor housed therein.

15 Claims, 14 Drawing Sheets

U.S. PATENT DOCUMENTS

| | | |
|---|---|---|
| 5,552,988 A | 9/1996 | Kawaguchi et al. |
| 5,808,387 A | 9/1998 | Akachi et al. |
| 5,925,947 A | 7/1999 | Kajiwara et al. |
| 6,339,269 B1 | 1/2002 | Hsiao |
| 6,384,507 B1 | 5/2002 | Lee et al. |
| 6,499,532 B1 | 12/2002 | Williams |
| 6,509,665 B1 | 1/2003 | Nishiyama et al. |
| 6,528,909 B1 | 3/2003 | Kan et al. |
| 6,943,467 B2 | 9/2005 | Potoradi et al. |
| 7,019,973 B2 * | 3/2006 | Rivera .................. 361/700 |
| 2006/0001269 A1 | 1/2006 | Jansen et al. |
| 2006/0066155 A1 | 3/2006 | Matin et al. |

FOREIGN PATENT DOCUMENTS

| | | |
|---|---|---|
| JP | 9-246056 | 9/1997 |

* cited by examiner

ELECTRIC MOTOR WITH HEAT PIPES

CROSS-REFERENCE TO RELATED APPLICATIONS

This application is a continuation-in-part of U.S. patent application Ser. No. 11/765,140 filed on Jun. 19, 2007, which claims priority to U.S. Provisional Application Ser. No. 60/805,192, filed Jun. 19, 2006. The disclosures of the above applications are incorporated herein by reference in their entirety.

FIELD

The present disclosure relates to electric motors. More specifically, the present disclosure relates to an electric motor having at least one heat pipe installed therein to assist in cooling of the motor.

BACKGROUND

Electric motors are used for a multitude of tasks and frequently those motors are used in applications where cooling of the motor is difficult. Commonly, these hard-to-cool applications involve large motors. One example of a hard-to-cool application is a motor powering a dry-pit submersible or an explosion-proof submersible motor. Many other hard-to-cool applications exist and the present disclosure is not limited to submersible motors. In the past these hard-to-cool applications utilized motors that were oversized for the application or placed in an enclosure that did not offer as much protection as a totally enclosed motor. These oversized motors are more expensive to purchase.

Electric motors are used in environments that although aggressive to the motor components, the motors are placed there because of the superior cooling provided in such environments. For instance, hermetic motors are integrated into the motor-compressor system where the electrical package of the motor, i.e., the rotor and stator, is exposed to the refrigerant. These motors achieve superior cooling because the refrigerant is cool and/or the refrigerant evaporates directly on the motor surfaces, thus cooling them, but the refrigerant is aggressive towards, and damaging to, the winding.

Heat pipes, generally, are a heat transfer mechanism that can transport large quantities of heat with a very small difference in temperature between hot and cold interfaces. A typical heat pipe consists of sealed hollow tube made of a thermoconductive metal such as copper or aluminum. The pipe contains a relatively small quantity of a "working fluid" or coolant (such as water, ethanol or mercury) with the remainder of the pipe being filled with vapor phase of the working fluid, all other gases being excluded. Internally, in order to overcome gravitational forces (or because of their absence in the case of space applications) most heat pipes contain a wick structure. This typically consists of metal powder sintered onto the inside walls of the tube, but may, in principle, be any material capable of soaking up the coolant.

SUMMARY

In various embodiments, the present disclosure provides a motor that includes a motor portion structured to house a stator and a rotor mounted to a shaft of the motor. The motor additionally includes a cooling portion disposed adjacent to the motor portion and separated from the motor portion by a structural interface. The cooling portion provides a cooling chamber structured to have a cooling fluid passed therethrough via a cooling fluid moving device that is structured to be coupled to and driven by the motor shaft. Furthermore, the motor includes a plurality of heat pipes having evaporator ends disposed within the motor portion and condenser ends disposed within the cooling chamber. During operation of the motor and cooling fluid moving device, the cooling fluid contacts the heat pipe condenser ends to extract heat from the condenser ends, hence cooling the evaporator ends of the heat pipes, thereby cooling the motor portion of the motor and the stator and rotor housed therein.

DRAWINGS

DETAILED DESCRIPTION

Figure 1:
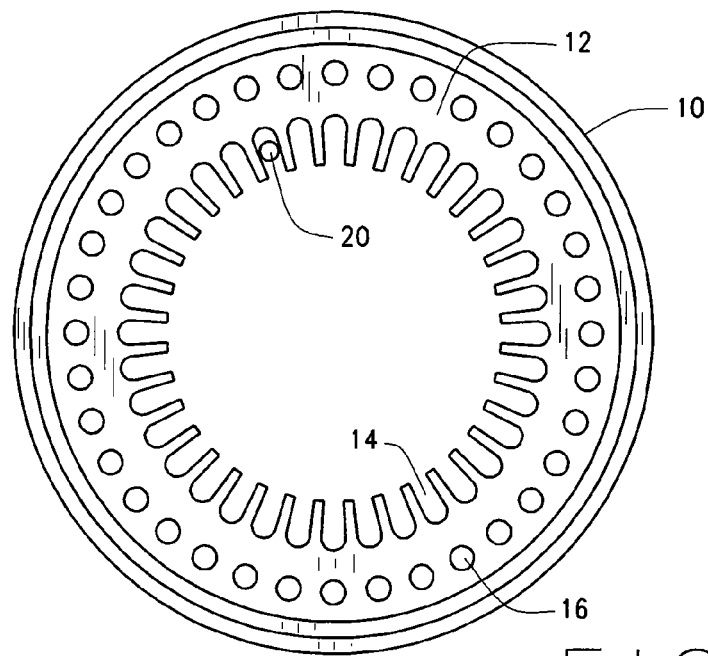
FIG. 1 is a cross-sectional view of a stator core and frame of a motor according to an embodiment of the present disclosure.

While this disclosure is susceptible of embodiment in many different forms, there is shown in the drawings and will herein be described in detail various embodiments of the disclosure with the understanding that the present disclosure is to be considered as an exemplification of the principles of the disclosure and is not intended to limit the broad aspect of the disclosure to the embodiments illustrated.

Various embodiments of the present disclosure comprise a totally enclosed motor having one or more heat pipes installed in order to increase cooling capability of the motor. The inventive motor is particularly adapted to applications where cooling is problematic. A motor made according to the present disclosure allows smaller, more efficient motors to be implemented where previously not possible. The present disclosure allows for higher continuous power density. While the various embodiments are primarily shown and described with respect to a distributed winding induction motor, the present disclosure may be implemented in other types of motors without departing from the scope of the present disclosure. By way of example and not limitation, various motor types (e.g. induction, synchronous, permanent magnet, and dc), various rotor types (fabricated copper bar, aluminum die cast, permanent magnet, and wound rotor), motor cooling methods (Totally Enclosed Fan Cooled (TEFC), submersible, hermetic, Totally Enclosed Pipe Ventilated (TEPV), Totally Enclosed Water Cooled (TEWC)) may be used although not shown in the various embodiments as one of ordinary skill in the art would recognize.

As used throughout this application, the term fluid should be defined to include a liquid or a gas. Various different liquids and liquid combinations could be used, such as water or water mixed with an alcohol, for example, or oil, and various gases could be used, such as pure gases or gas combinations, such as air.

What is described below is the use of heat pipes in an electric motor. In one embodiment heat pipes are incorporated into the stator slot to directly cool the windings. Most of the heat in an electric motor is generated in the motor winding. Thus, putting the heat pipe in close proximity to the copper winding will make the heat transfer most efficient there. The heat pipes may also be implemented in the core/laminations of the stator. While less so than the windings, heat is generated in the core. In addition, the heat conduction path from the windings thru the core is shorter and involves one less interface (as compared to heat pipes in the frame or back iron ring). Heat pipes may also be implemented in the frame. The heat pipes in the frame absorb heat that is generated in the winding and the core. The conduction path is longer, and an additional interface (the core to frame interface) is encountered. This reduces the efficiency of the heat transfer. However, it will still be superior to the heat transfer efficiency as compared to a traditional TEFC or TEWC motors commonly used in industry. Heat pipes may be implemented also in the back iron ring. The same arguments apply here as in the heat pipes in the frame. A disadvantage here is that an additional part, the back iron ring (BIR), is required. An advantage is that a manufacturer's standard laminations and frames can be used.

Heat pipes may also be implemented in the rotor. Longer rotor bars are used and extend beyond the end connector. These extensions cool the bars as they circulate in the air. Rotor efficiency is related to rotor resistance. The resistance itself is a function of rotor bar temperature. If the bar operating temperature drops, then the resistance drops, with subsequent increase in efficiency. Moreover, across the line starting causes severe rotor heating. The number of permissible starts for a large induction motor is related to how much heat the rotor bars can absorb. With heat pipes in the rotor bars, the heat is moved so rapidly from the bars that the rotor bars have a higher effective heat capacity. This in turn increases the number of hot starts that the motor can be subjected to. The heat pipes may be implemented, such as for example fabricated or cast induction rotors, solid (bar-less) rotors, stacked lamination rotors, wound rotors, including induction, synchronous, DC rotors, and permanent magnet rotors.

In addition to where a heat absorbing end of a heat pipe is placed in a motor to absorb heat ("the evaporator end"), where the other end of the heat pipe is placed to reject heat ("the condensing end") is important. In accordance with various embodiments, in submersible motors, commonly known to drive a pump operable to pump, or move, a fluid and be coupled to a mounting plate of the motor, the condensing end of the heat pipe may be placed in an oil filled cooling chamber, sometimes referred to as an oil chamber, associated with the motor to rejected heat to oil within the oil chamber. The oil is, in turn, cooled by the mounting plate. Particularly, the mounting plate is an integral part of the submersible motor and serves two functions: it closes off the bottom of the oil chamber and provides for means of mounting the pump directly on the motor (which is commonly the practice on submersible motors). Accordingly, in such embodiments, the mounting plate may be considered to be an 'infinite cold plate' because it stays at a substantially constant temperature as a result of the pumping of a high volume of fluid, at relatively cool temperatures, through the pump, wherein the fluid being pumped contacts and cools the mounting plate as it is propelled through the pump. Consequently, the oil in the oil chamber is cooled by contacting the constant temperature mounting plate.

Alternatively, as described below, in various embodiments, the motor frame not only encloses the rotor and stator assembly, i.e., the electrical package, but extends beyond the portion of the motor enclosing the electrical package enclosure and beyond the bearing housing and plate 24 and 26 such that a working device, e.g., a pump, can be directly mounted to the portion of the frame extending beyond the electrical package enclosure. Additionally, as described below, in such embodiments, the heat pipes can be disposed directly within the frame such that an evaporator end of each heat pipe is adjacent the electrical package enclosure and a condenser end of each heat pipe is within the portion of the frame extending beyond the electrical package enclosure.

In water cooled motor embodiments of the present disclosure, the condenser end of the heat pipe is cooled by a cooling head—a water cooler which surrounds the condenser end. In addition to more efficient heat extraction, there are additional advantages. For instance, a cooling portion of the motor (i.e. the 'wet head') does not have to surround the frame itself, which is commonly done on totally enclosed water cooled (TEWC) machines. Likewise elaborate air circulation throughout internal motor components and then through a water-to-air heat exchanger is also not required. Also, leaks are contained to the cooling head. In addition, the cooling head can be switched from a 'wet head' to an 'air head' if cooling water is no longer available.

In air cooled motor embodiments of the present disclosure, the condenser end of the heat pipe is cooled by 'air head' cooling head—an air heat exchanger which extracts heat from the condenser end of the heat pipes to fins to the cooling air that blows over the fins. In addition to more efficient heat extraction (as a result of where the heat pipes pick up the heat from the winding and stator), there are additional advantages. For instance, the air can be easily routed thru the heat exchanger like in a pipe ventilated motor. This easy air routing is not possible with current TEFC motors. In addition, the cooling head to can be switched from an 'air head' to a 'wet head'.

In contemporary hermetic motors the coil end turns and the core are directly exposed to and cooled by the cooling media, e.g., Freon. However, in various embodiments of the present disclosure, it is possible to extract heat from the windings within the core as efficiently without directly exposing sensitive internal motor components to the harsh chemicals of the cooling media and environmental conditions which current technology hermetic motors do. In the present disclosure, the sensitive motor components, such as the stator 12 and rotor 42 are not exposed to the aggressive cooling media. Rather, as described below, condenser ends of heat pipes are directly cooled by the cooling media, e.g., Freon. Therefore, the cooling portion, which is hermetically sealed from the electrical package enclosure portion, can be independently hermetically sealed and cooled. Or, alternatively, as described below, the heat pipe condenser ends can be disposed within a portion of the motor frame that extends beyond the electrical package enclosure portion such that the cooling media cools the frame which in turn cools the heat pipe condenser ends.

Figure 2:
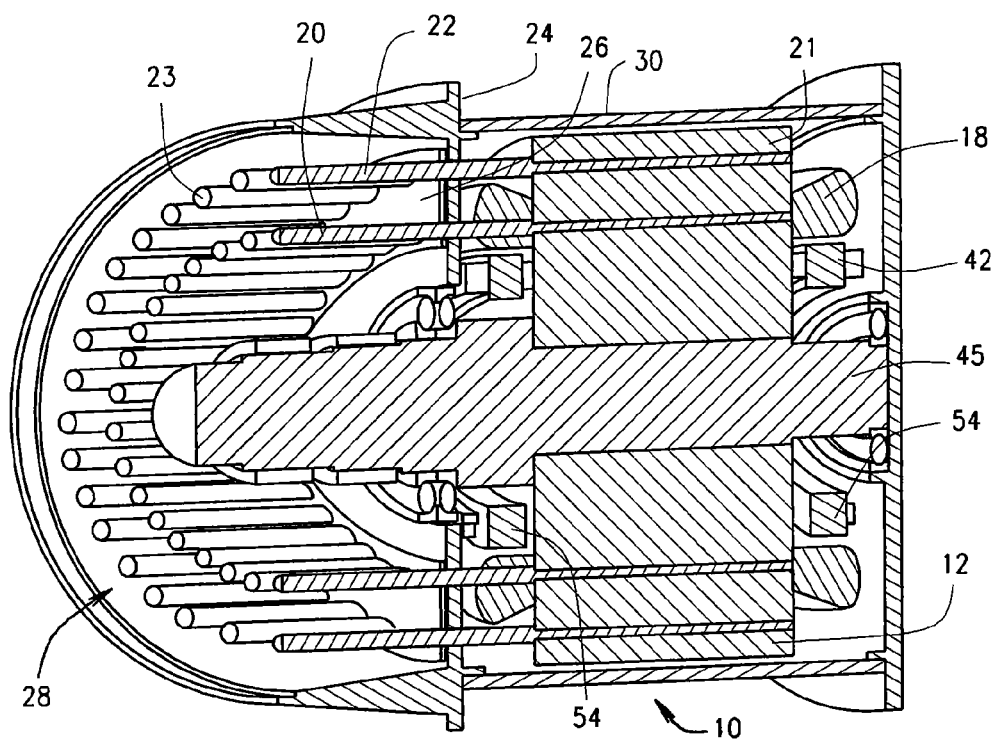
FIG. 2 is a perspective, cross-sectional view of a motor according to an embodiment of the present disclosure.

In that regard and referring to FIGS. 1 and 2, there is shown the stator core 12 of an electric motor 10. The motor 10 is shown in partial view, and in FIG. 1 without its windings, for clarity of display. The stator core 12 comprises laminations of electrical steel that form a plurality of slots 14 and bores 16 that are radially spaced about the stator core 12. As with conventional electric motors, the slots 14 are wound with a stator winding 18. In various embodiments, heat pipes 20 are inserted in each slot 14 of the motor with the stator winding 18. Moreover, heat pipes 22 are placed within each bore 16 of the stator core 12.

Figure 3:
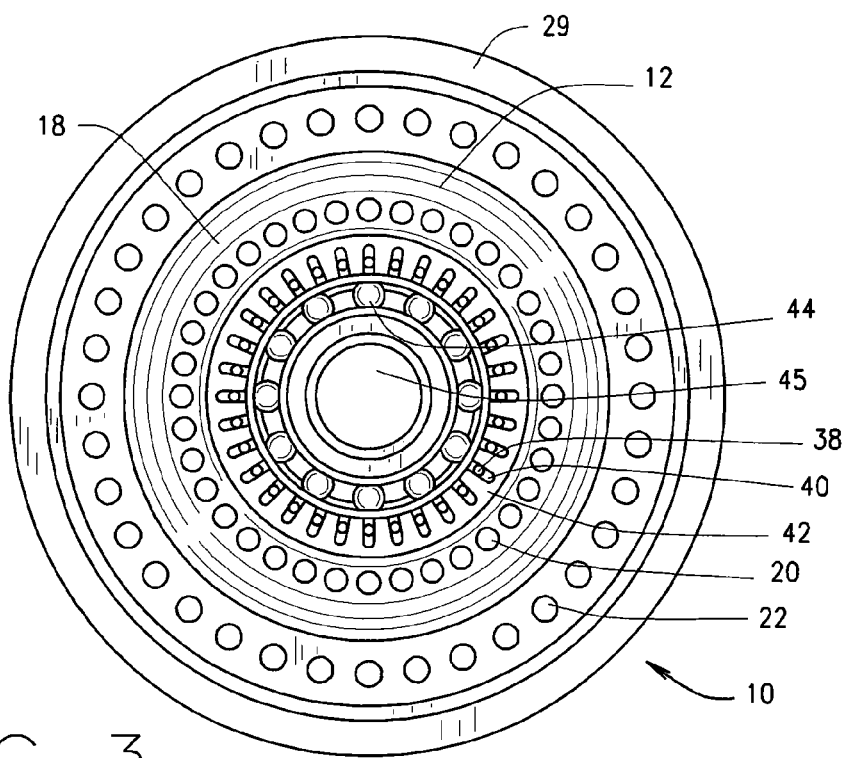
FIG. 3 is an end view of a motor according to an embodiment of the present disclosure.
Figure 4:
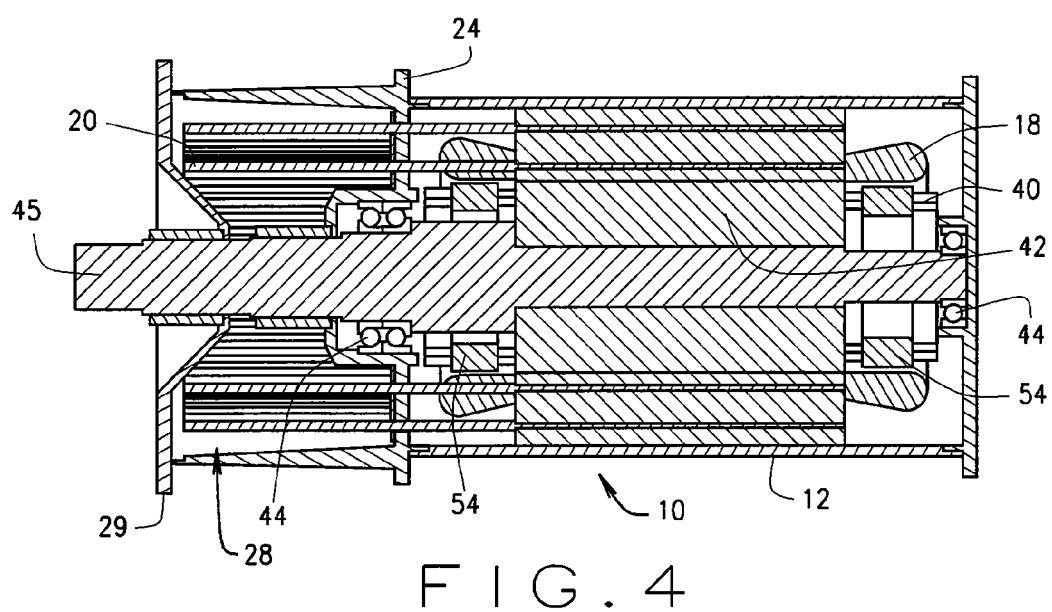
FIG. 4 is a cross-sectional side view of a motor according to an embodiment of the present disclosure.

Referring to FIGS. 2-4, the heat pipes 20 and 22 extend through a drive end bearing housing 24 and a heat pipe clamp plate 26 of the motor 10 and into a cooling chamber 28 that can be filled with oil or other cooling fluid. The oil or other fluid acts as a heat sink and transfers the heat to a mounting plate 29. A pump (not shown), driven by the motor 10 and operable to pump, or move, a fluid is mounted directly to the mounting plate 29. The pump is cooled by the fluid (pump medium) that it is pumping. In addition, some of the pumped fluid (pump medium) is directly in contact with the mounting plate 29. Therefore, the fluid (pump medium) cools the pump as well as the mounting plate 29. The mounting plate 29 in turn cools the oil, the oil cools condenser ends 23 of the heat pipes 20 and 22, and the heat pipes 20 and 22 cool the stator core 12 and winding 18, as described herein. As a result, the heat pipes 20 and 22 increase the capacity of heat dissipation. Accordingly, the heat pipes 20 and 22 in the stator core 12 and stator winding 18 move the heat generated in the stator core 12 and stator winding 18 to the oil in the cooling chamber 28. The oil is dielectric, so that submersible motor moisture probes, in submersible pump applications, can properly function.

With the heat pipes 20 and 22 thus inserted, top ends 21 of the heat pipes 20 and 22 that are in the stator core 12 and stator winding 18 serve as an evaporator portion of the heat pipes 20 and 22. Bottom ends 23 of the heat pipes 20 and 22 serve as the condenser ends of the heat pipes 20 or 22. The oil within the cooling chamber 28 is kept cooled by conduction, convection and radiation of heat from the exterior surface of the cooling chamber 28. More particularly, when the motor 10 is used to drive or operate a fluid pump, the fluid moving through the pump (pump medium) acts as a coolant that cools the mounting plate 29, which provides an essentially constant temperature heat sink that cools the oil within the cooling chamber 28. Consequently, the cooled oil within the cooling chamber 28 cools the condenser ends 23 of the heat pipes 20 and 22.

Figure 5:
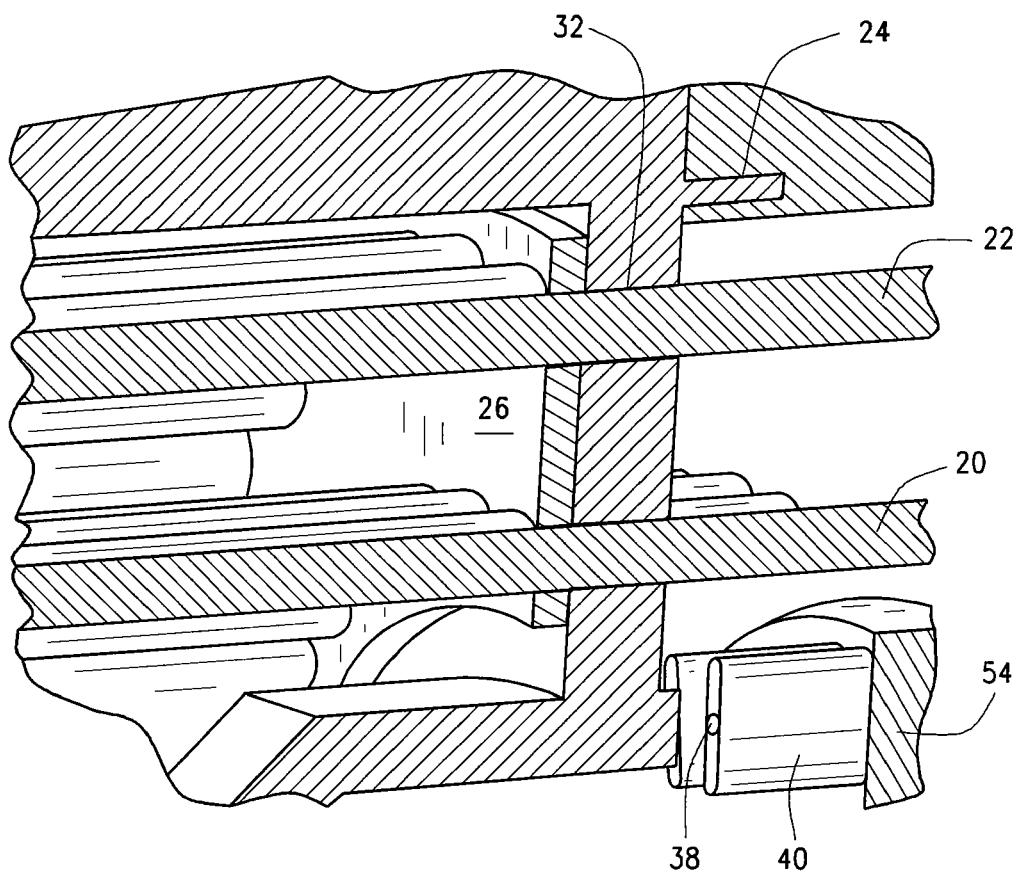
FIG. 5 is an enlarged, perspective cross-sectional view of a motor according to an embodiment of the present disclosure.

FIG. 5 shows the sealing arrangement between the drive end bearing housing 24 and the clamping plate 26, in accordance with various embodiments. The drive end bearing housing 24 includes a plurality of bores 32 through which the heat pipes 20 and 22 extend into the cooling chamber 28. Counterbores are formed on the cooling chamber 28 side of the drive end bearing housing 24 which contain o-rings (not shown). The o-rings within the counterbore are compressed slightly by the clamping plate 26 after the clamping plate is installed over the heat pipes 20 and 22 in order to seal the heat pipes 20 and 22 and prevent oil from escaping the cooling chamber 28.

Figure 6:
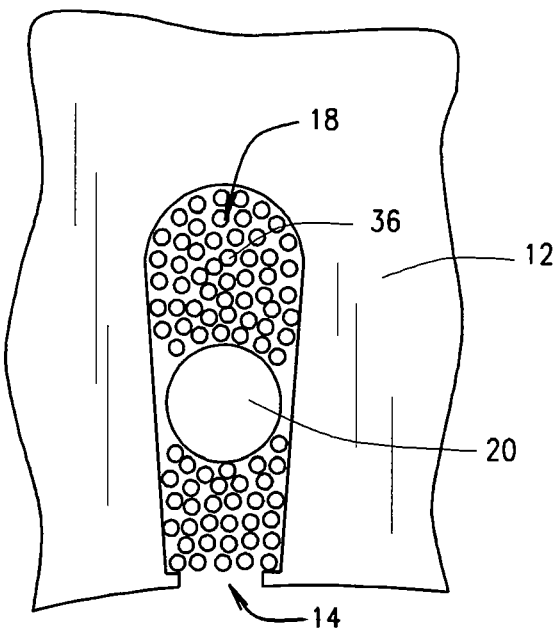
FIG. 6 is a close up cross sectional view of wound stator with a heat pipe inserted in center of the winding according to an embodiment of the present disclosure.

Shown in FIG. 6, the wire 36 of the stator core winding 18 is in close proximity to the heat pipe 20 in order to dissipate heat from the stator core winding 18. In the manufacturing process the heat pipe will be located in a position chosen for manufacturing ease and thermal efficiency. This can be at the top of the slot, center of the slot or end of the slot. The heat pipe 20 is shown centrally located within the slot 14 by first winding the stator slot 14 to a depth of roughly half the depth of the slot 14 minus half of the diameter of the heat pipe 20. The heat pipe 20 is then inserted into the slot 14 and the remaining wire 36 of the stator winding 18 is wound within the slot 14. While noting that the heat pipe 20 is shown as having a diameter of less than the width of the slot 14, it is within the scope of the present disclosure to comprise a heat pipe 20 that fits snugly or with a small interference fit within the slot 14 of the stator 12. While the present disclosure is illustrated with respect to a random wound stator, it should be apparent to one of ordinary skill in the art that the other winding techniques such as form wound coils may be used without departing from the scope of the present disclosure. The heat pipe 20 may also be located within the top or bottom of the slot 14 without departing from the scope of the present disclosure.

The heat pipes 22 of the stator core 12 also extend into the oil of the cooling chamber 28 and dissipate heat from the outer diameter of the stator core 12.

The above-described stator core of FIG. 6 and windings 12 and 18 of the present disclosure comprise an integral piece and represent a first option for forming the stator core 12. The first option consists of using a stator core 12 with the particular standard frame size but having slot geometry one frame size smaller and a stator outside diameter of one size larger standard frame size. In this manner, minimal tooling change is required from presenting existing tooling. However, this method will use significantly more electrical steel due to the increased size of the stator core 12 and thus is more expensive. Finally, the heat pipe bores 16 must be punched or machined into the stator core 12.

Figure 7:
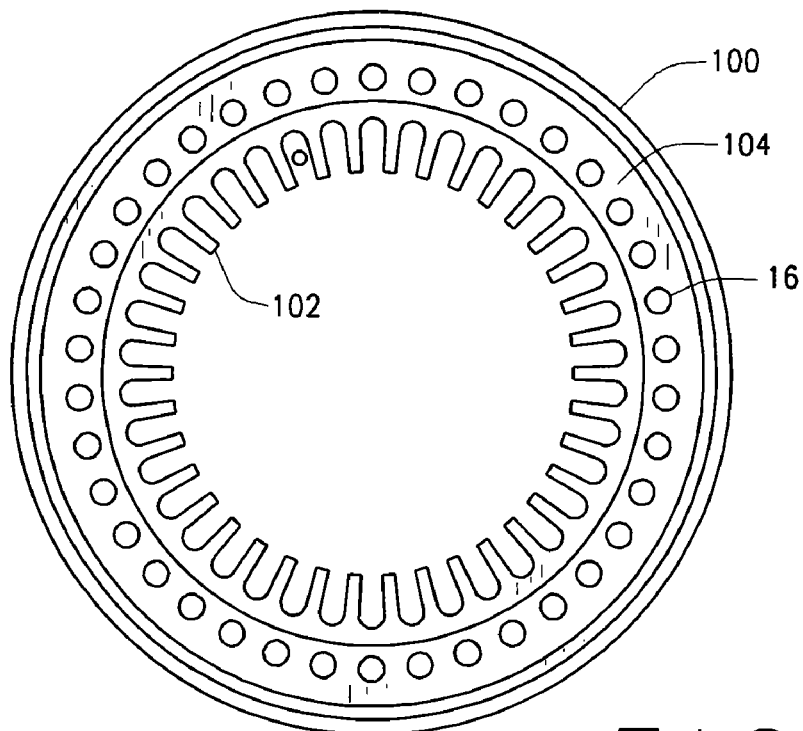
FIG. 7 is an end view of a stator core and frame of a motor according to another embodiment of the present disclosure.

The second option, shown in FIG. 7, is to use a one larger particular standard frame size outer frame 100 or "mechanical package," one smaller standard frame size inner stator core 102 or "electrical package" and a back iron ring 104. The back iron ring is designed to make up the difference in the outer diameter of the stator core 102 and the inner diameter of the outer frame 100. For example, if the outer frame 100 was for a 440 standard frame size and the inner stator core was for a 400 standard frame size stator, the back iron ring would be approximately 1.25 inches thick. It would thereby bridge the gap between a 17.5-inch stator outside diameter of a 400 standard frame size motor and the 20-inch inside diameter of a 440 standard frame size motor. The heat pipe holes 16 would be bored or gun drilled in the back iron ring 104.

Figure 8:
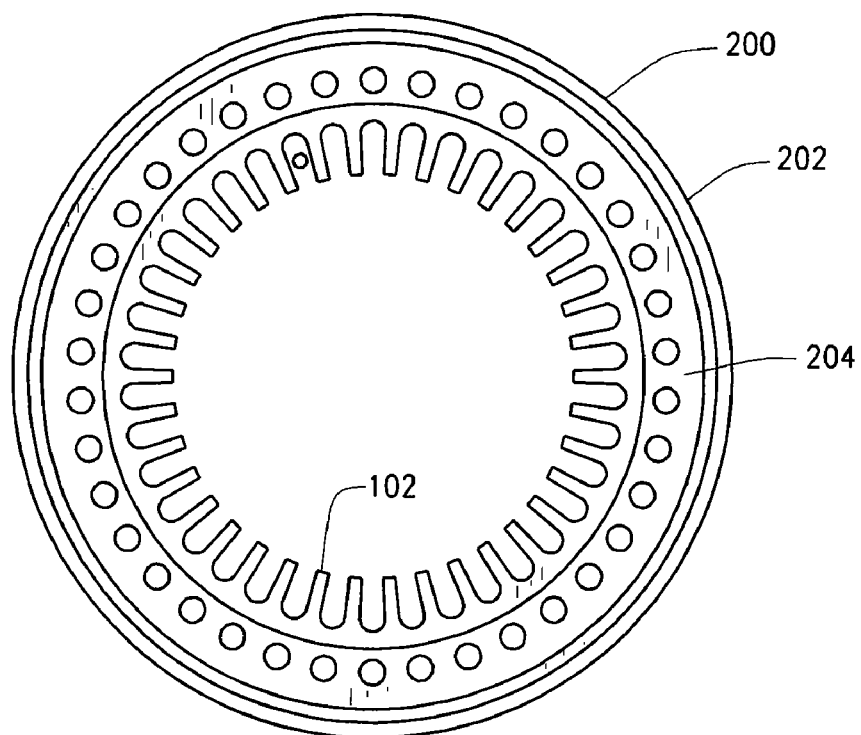
FIG. 8 is an end view of a stator core and frame of a motor according to another embodiment of the present disclosure.

Referring to FIG. 8, a third option is to integrally cast or fabricate a special frame 200. This frame 200 integrates the back iron ring 104 of the second option into an outer frame 202, and does not require an additional part of the back iron ring 104. This frame 200 has the outer sizings of a particular size frame (440, for example), but is cast to accommodate a stator of one smaller standard motor size (400, for example). The option requires a new casting pattern for the frame (if the frame is cast), but has the advantage of using standard electrical components and takes advantage of casting cheaper cast iron to take up the gap between the outer frame and the stator core 204 instead of using more expensive electrical steel or an additional back iron ring. The heat pipe holes 16 would be bored or drilled in the frame when the frame is machined.

Referring to FIG. 6, the stator winding 18 is wound in a slot 14 of the stator core 12 and about the heat pipe 20. In that regard, the winding 18 is first wound to half of the depth of the slot 14 in the stator core 12 minus half the diameter of the heat pipe 20. The heat pipe 20 is then inserted, and the stator winding 18 is continued over the heat pipe 20. By reducing the operating temperature of the stator winding 18, the amount of current the stator winding 18 can carry is effectively increased and the resistance of the stator winding 18 is similarly reduced with subsequent increase in efficiency.

Figure 9:
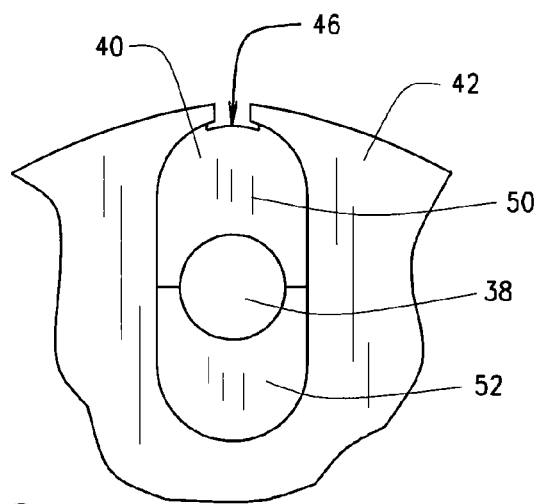
FIG. 9 is an enlarged view of a heat pipe installed in a rotor bar according to an embodiment of the present disclosure.
Figure 10:
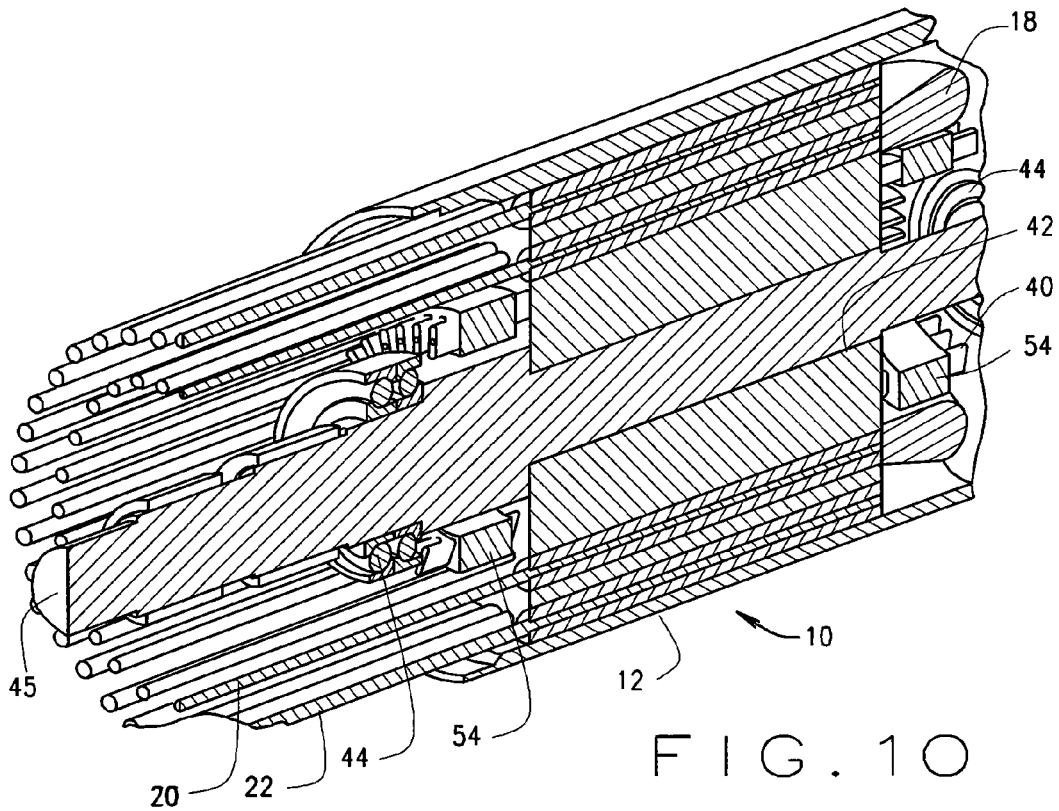
FIG. 10 is a perspective cross-sectional view of a motor according to an embodiment of the present disclosure.

Heat pipes may similarly be inserted into the rotor to assist in dissipating heat. Specifically, referring back to FIGS. 2-5, heat pipes 38 can be inserted into rotor bars 40 of a rotor 42 of the motor 10. The rotor 42, of course, is mounted on the shaft 45 which rotates within the stator 12 on bearings 44. As shown in FIGS. 9 and 10, the rotor 42 is punched with a cavity 46 therein for accepting a rotor bar 40. In various embodiments, the rotor bar 40 comprises two halves 50 and 52 which envelope the heat pipe 38 within the rotor 42. While splitting the rotor bar in two halves is desirable for ease of installation of a heat pipe 22, the rotor bar 40 can comprise a single, integral rotor bar 40 and the heat pipe 38 inserted on top or below the rotor bar 40 without departing from the scope of the present disclosure. Moreover, while the heat pipe may be installed in the rotor bar, it may also be installed additionally or exclusively within the rotor core.

Figure 11:
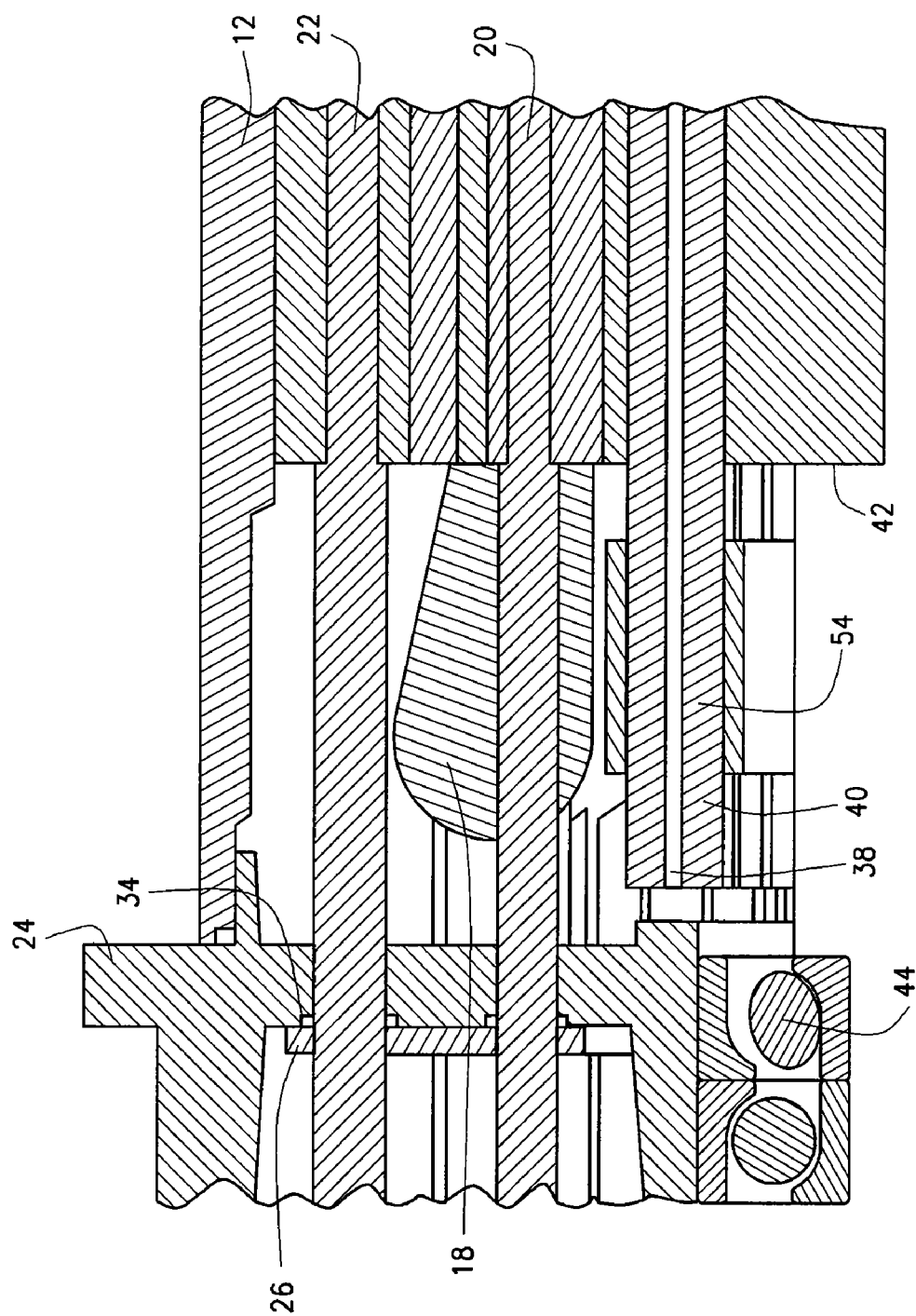
FIG. 11 is an enlarged partial view of a motor having heat pipes installed therein according to an embodiment of the present disclosure.

Referring to FIGS. 10 and 11, the rotor bars 40 extend beyond the rotor 42 into an air pocket formed between the rotor 42 and the end plate (not shown in FIG. 10) to essentially form a fan. The fan cools the exposed ends of the rotor bars 40 and heat pipes 38 as the rotor 42 rotates. An end connector ring 54 is further disposed on the extended portion of the rotor bars 40 and the heat pipes 38. A benefit of the end connector ring 54 is that it serves as a heat sink for the rotor bars 40. Cooling the rotor bars 40 and end connector ring results in a more efficient rotor. Allowing the end connector to serve as an additional heat sink for the rotor bars 40 increases how much heat the rotor bars 40 themselves can absorb, which in turn increases the number of hot, e.g. successive, starts, or amount of time in a stalled condition that the rotor can be subjected to.

As discussed, the heat pipes 38 in the rotor bars 40 move the heat generated in the rotor bars 40. In various embodiments, the heat pipes each comprise an evaporator portion and a condenser portion.

Moreover, the heat pipes 20, 22 and 38 are heated initially as part of the manufacturing process such that the pressure within the heat pipe 20, 22 and 38 causes it to expand. The heating is sufficient such that it causes the heat pipe to yield and expand. This does two things. It mechanically secures the heat pipe 20, 22 and 38 to the stator core 12 or rotor 42, as the case may be, and increases the degree of thermal contact between the stator core 12 or rotor 42 and the heat pipe 20, 22 and 38. The heat pipe may alternatively be pressed into position in a vertical or horizontal motor frame with the heat pipes now extending out and through the opposite drive end bracket or held in position by a fastening method such as epoxy, solder or braze. Each heat pipe can still be individually "O" ring sealed through the opposite drive end bracket using the same counter bore process as described above.

Figure 12:
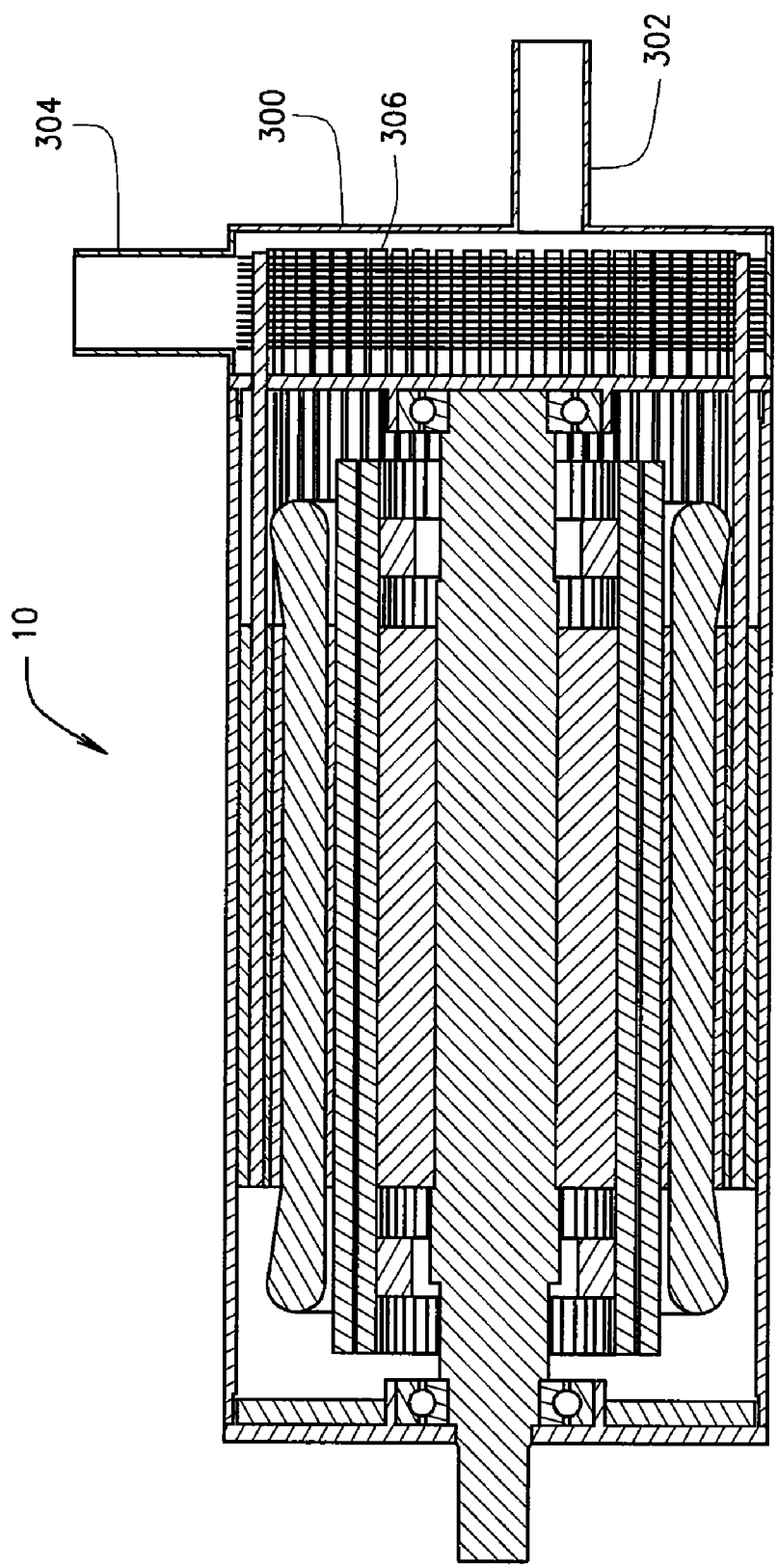
FIG. 12 is a side cross-sectional view of a motor having heat pipes cooled by ducted air according to an embodiment of the present disclosure.
Figure 13:
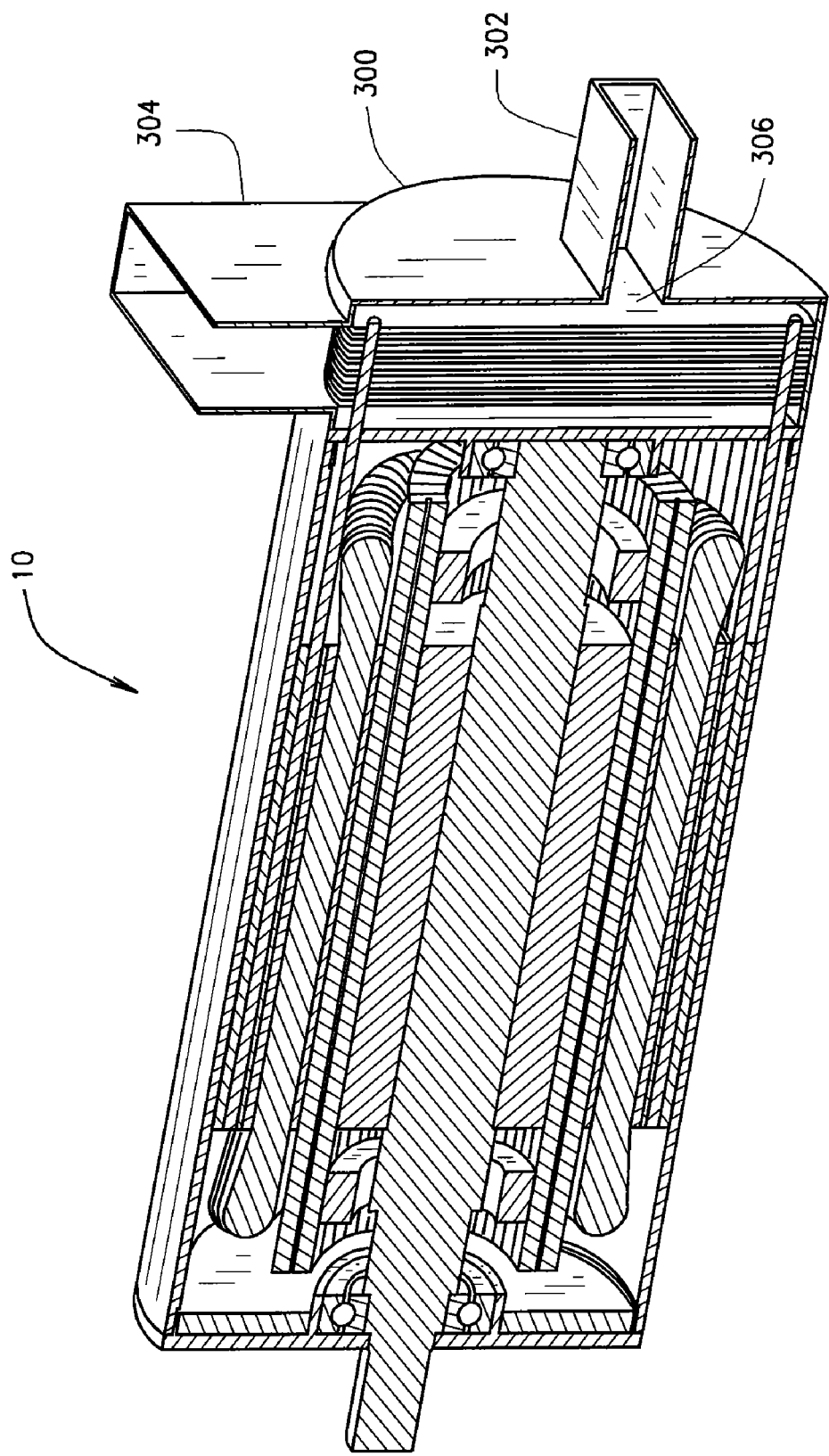
FIG. 13 is a cross-sectional perspective view of a motor having heat pipes cooled by ducted air according to an embodiment of the present disclosure.

Referring to FIGS. 12 and 13, heat pipes may be implemented in an air cooled motor. In FIGS. 12 and 13, like numerals represent like features of the prior described embodiments. The motor 10 further includes an air chamber 300 into which heat pipes from the motor 10 (except the heat pipes of the rotor) extend. The air chamber 300 includes an air inlet 302 from which air is ducted to cool the heat pipes and an air outlet 304 through which heated air that has passed over the heat pipes exits. Cooling fins 306 are attached to the heat pipes and provide greater surface through which to extract heat from the heat pipes.

Figure 14:
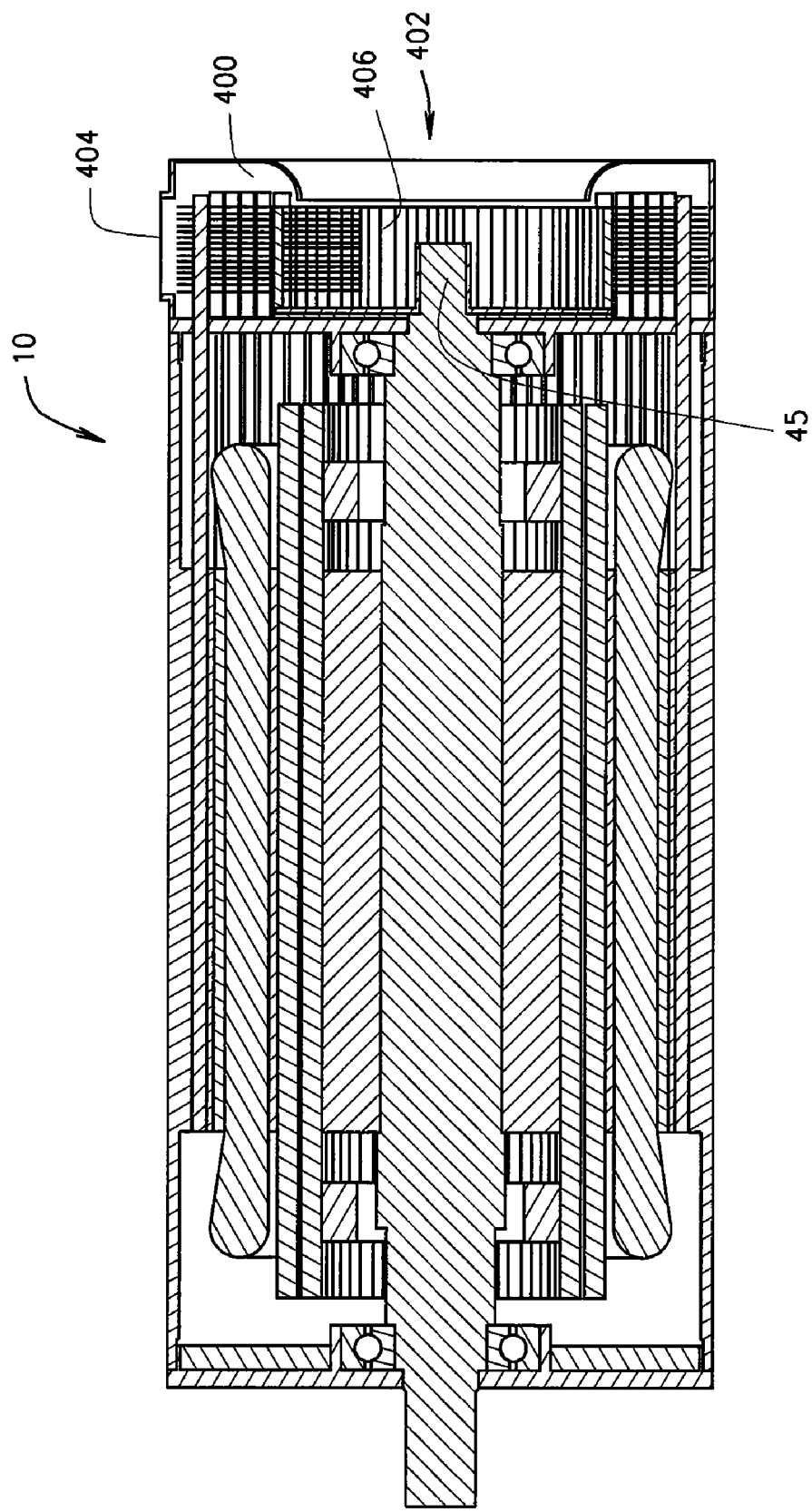
FIG. 14 is a side cross-sectional view of a motor having heat pipes cooled by a fan according to an embodiment of the present disclosure.
Figure 15:
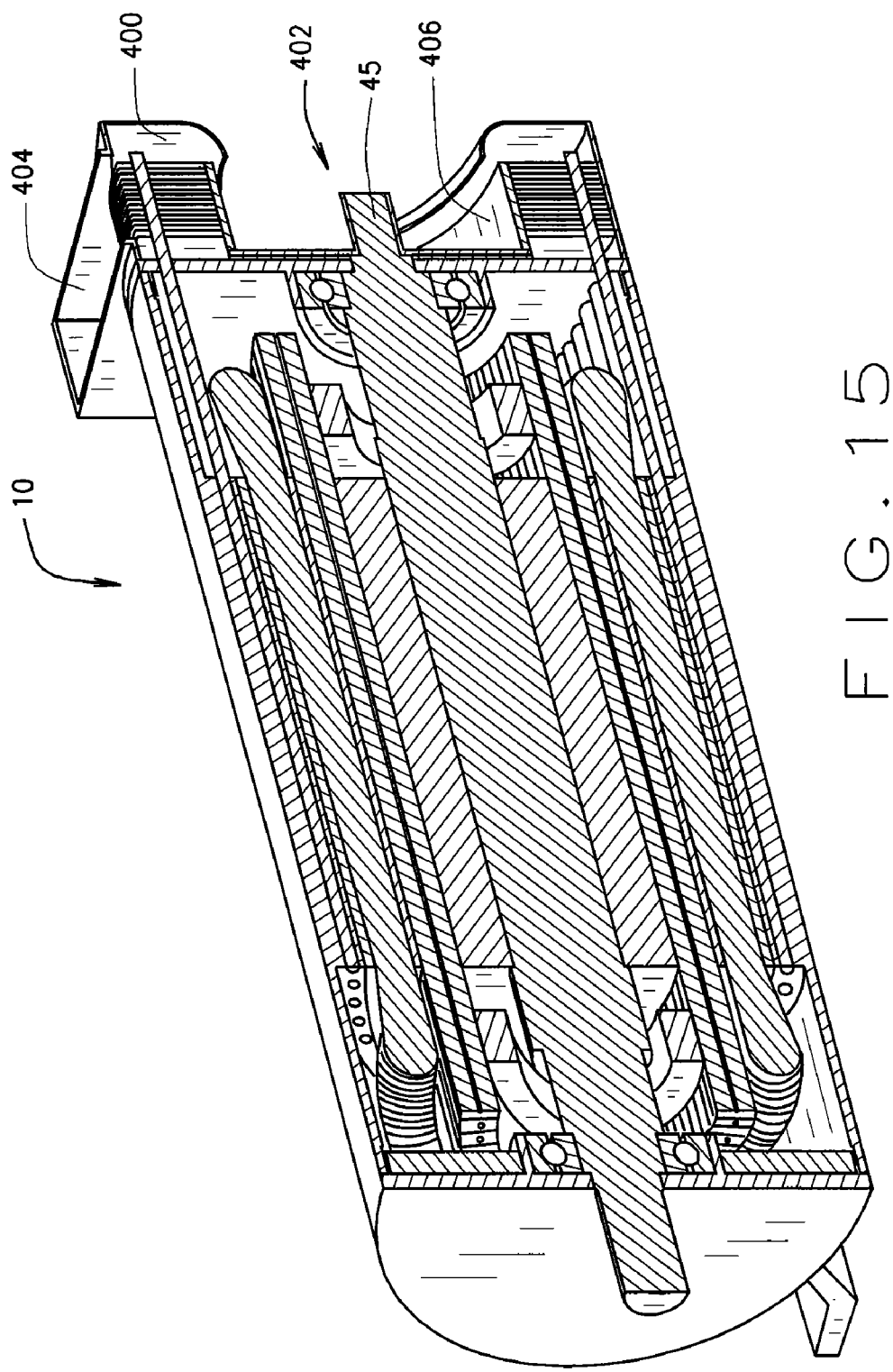
FIG. 15 is a cross-sectional perspective view of a motor having heat pipes cooled by a fan according to an embodiment of the present disclosure.

Referring to FIGS. 14 and 15, heat pipes may be implemented in a fan cooled motor. In FIGS. 14 and 15, like numerals represent like features of the prior described embodiments. The motor 10 further includes an air chamber 400 into which heat pipes from the motor 10 (except the heat pipes of the rotor) extend. The air chamber 400 includes an air inlet 402 from which air is ducted to cool the heat pipes and an air outlet 404 through which heated air that has passed over the heat pipes exits. A fan 406 attached to the shaft 45 forces air from the air inlet 402 to the air outlet 404 over the heat pipes. Cooling fins 408 are attached to the heat pipes and provide greater surface through which to extract heat from the heat pipes.

Figure 16:
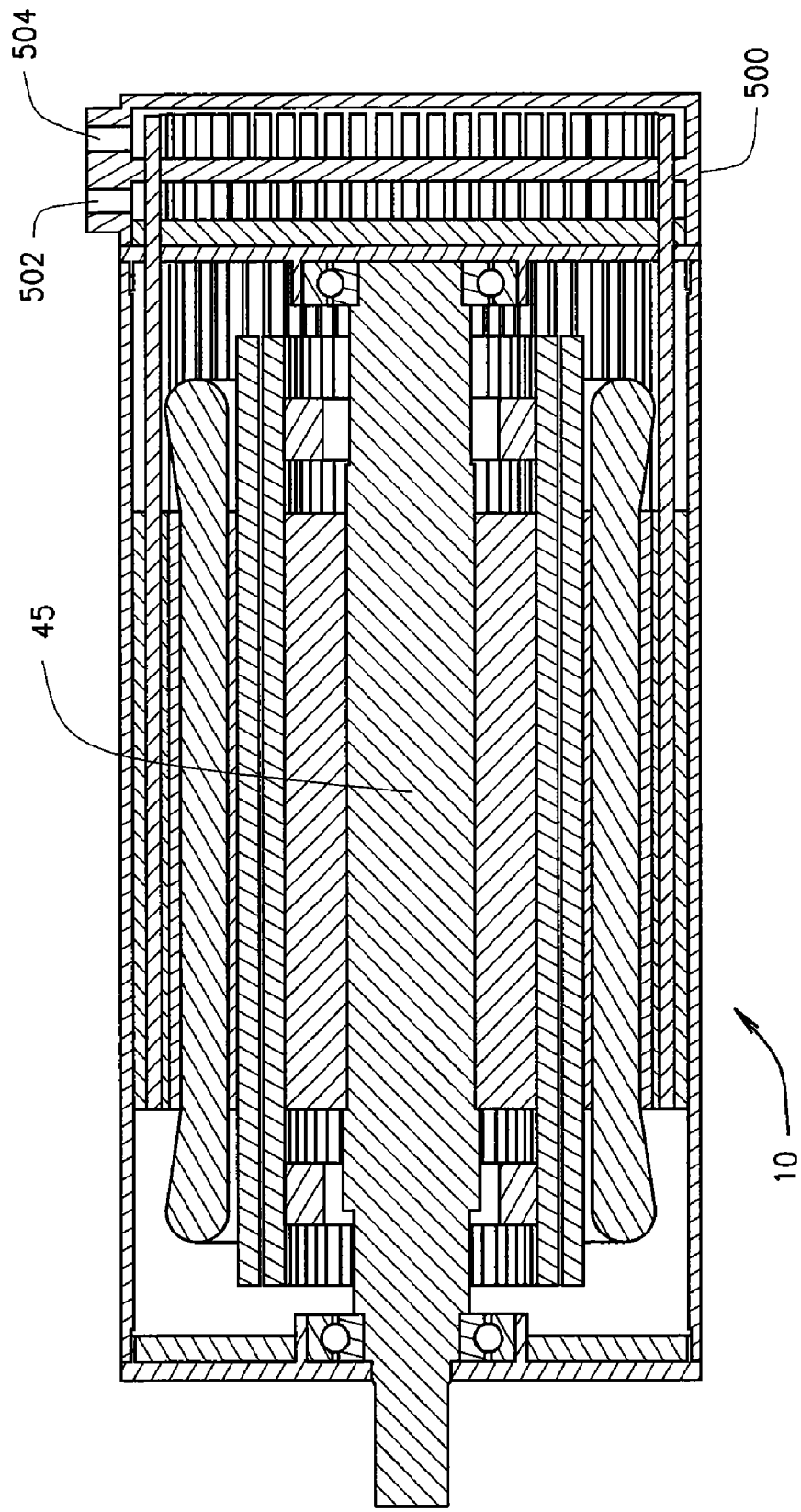
FIG. 16 is a side cross-sectional view of a motor having heat pipes cooled by liquid according to an embodiment of the present disclosure.
Figure 17:
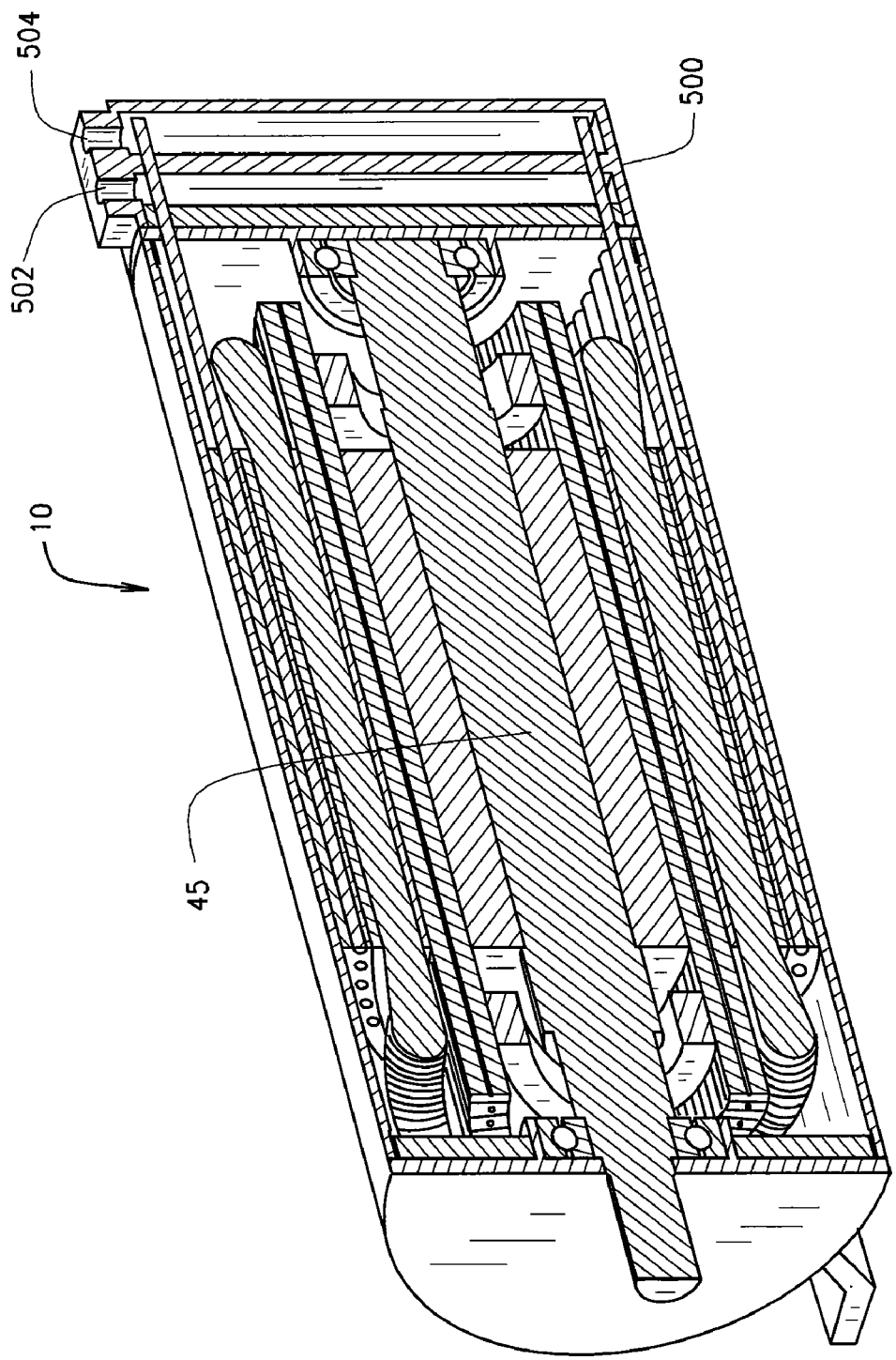
FIG. 17 is a cross-sectional perspective view of a motor having heat pipes cooled by liquid according to an embodiment of the present disclosure.

As described above, the heat pipes of the motor 10 may also be cooled by a liquid-based coolant, for example water or ethylene-glycol/water combinations. In FIGS. 16 and 17, like numerals represent like features of the prior described embodiments. In various embodiments, exemplarily illustrated in FIGS. 16 and 17, the motor 10 further includes a coolant chamber 500. The heat pipes of the motor, except the heat pipes of the rotor, extend into the coolant chamber 500. The coolant chamber 500 includes a coolant inlet 502 into which coolant is pumped via a pump (not shown) that can be coupled to and driven by the shaft 45 and can be mounted to the cooling portion, and a coolant outlet 504 through which coolant is routed after it has passed over the heat pipes. Cooling fins are not shown in the present embodiment, but one of ordinary skill in the art would recognize based upon the teachings of the prior embodiments that cooling fins may be implemented in this embodiment as well.

Figure 18:
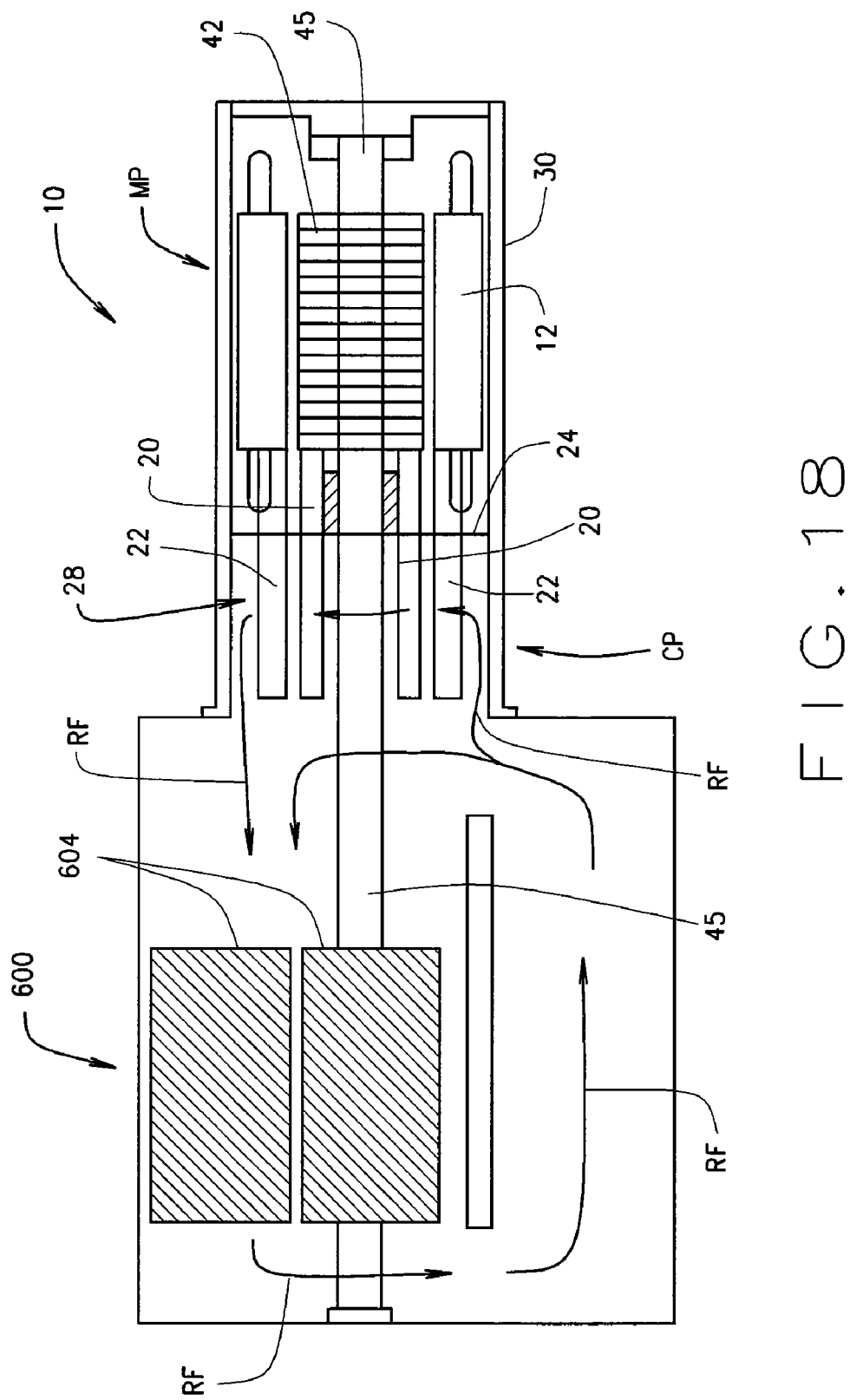
FIG. 18 is a schematic of a portion cooling system mounted to a motor having heat pipes cooled by a refrigerant of the cooling system according to an embodiment of the present disclosure.

Referring to FIG. 18, as described above, in various embodiments wherein the motor 10 is a heat pipe cooled hermetic motor 10, the condenser end of the heat pipes 20 and 22 are cooled by the cooling media, e.g., Freon. Thus, it is possible to extract heat from the electrical package, i.e., the rotor and stator, efficiently without directly exposing sensitive internal motor components to the harsh chemicals of the cooling media. Additionally, the motor portion, identified as MP in FIG. 18, does not have to be hermetically sealed from the ambient environment. The cooling portion, identified as CP in FIG. 18, is separate from the motor portion MP and can be independently hermetically sealed and cooled. Particularly, a hermetic seal is provided around the heat pipes 20 and 22 and the motor shaft 45 such that the harsh refrigerant can not enter the motor portion MP, i.e., the electrical package enclosure, of the motor 10. Additionally, the hermetically sealed cooling portion CP prevents the cooling system from leaking into the ambient environment.

For example, as exemplarily illustrated in FIG. 18, the hermetic motor 10 can be coupled to a cooling system 600 that includes a compressor device 604. The cooling system 600 can additionally include a liquid receiver, an evaporator, and various control devices, which are not shown in FIG. 18 and not necessary for one skilled in the art to readily understand the scope of the present disclosure. Generally, the compressor device 604 is structured and operable to compress a refrigerant to change the refrigerant from a gaseous phase to a cold liquid phase. In addition to cooling the object, system, area or environment (not shown) that the cooling system 600 is intended to cool, the cold liquid phase refrigerant is circulated through other portions of the cooling system 600, and the cooling portion CP, where the cold liquid phase refrigerant extracts heat from the object to be cooled, and the condenser ends of the heat pipes 20 and 22, whereby the refrigerant is heated and converted back the gaseous phase.

More particularly, as exemplarily illustrated in FIG. 18, in various embodiments, the hermetic motor 10 includes the motor portion MP and the cooling portion CP that are separated by a structural interface, e.g., the bearing housing 24. In various implementations, the motor frame 30 of the hermetic motor 10 can define both the motor portion MP and the cooling portion CP, wherein the cooling portion CP is separated and hermetically sealed from the motor portion MP by the structural interface, e.g., the bearing housing 24.

In such embodiments, the motor portion MP of the frame 30 houses the stator 12 and the rotor 42, i.e., the electrical package, and the cooling portion CP of the frame 30 is structured to have the cooling system 600 mounted thereto such that a hermetically sealed cooling chamber 28 is defined between the structural interface and the cooling system 600. Additionally, in such embodiments, the compressor device 604 is structure to be coupled to and driven by the motor shaft 45 and operable to compress a gaseous refrigerant thereby causing the refrigerant to change from the gaseous phase to a cold liquid phase. The compressor 604 is additionally structured and operable to circulate the refrigerant through the cooling system 604 such that a refrigerant flow RF is introduced into the hermetically sealed cooling chamber 28. The refrigerant is prevented by the structural interface from entering an interior portion of the motor frame that includes the rotor 42 and the stator 12.

As described above, the evaporator ends of heat pipe 20 and 22 are disposed within the motor portion MP and the condenser ends are disposed within the hermetically sealed cooling chamber 28. Therefore, as the refrigerant flow RF is circulated through the cooling system 600, the compressor device 604 compresses the refrigerant, converting the refrigerant from the gaseous phase to the cool liquid phase, whereby the refrigerant flow RF is also introduced into the cooling chamber 28 and contacts the condenser ends of the heat pipes 20 and 22. Upon contact with the heat pipe condenser ends, the refrigerant extracts heat from the condenser ends. Hence, the refrigerant flow RF passes over the condense ends of the heat pipes 20 and 22, thereby extracting heat from the condenser ends, which cools the evaporator ends, which, in turn, cools the motor portion MP and the electrical package, i.e., the rotor 42 and stator 12.

Figure 19:
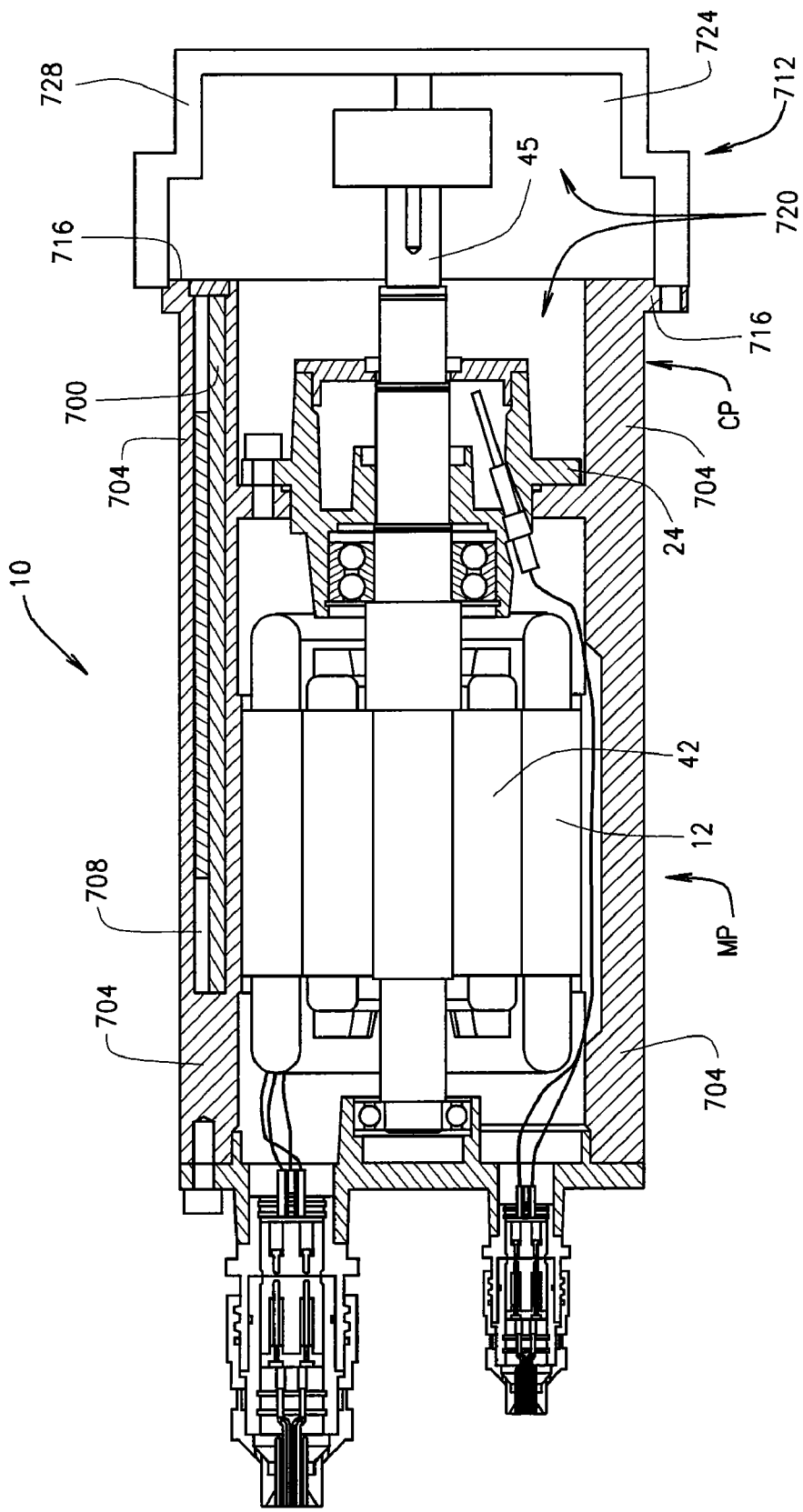
FIG. 19 is a schematic of a portion of a cooling system mounted to a motor having heat pipes disposed within a motor frame that extends beyond a rotor and stator enclosure portion of the frame according to an embodiment of the present disclosure.

Referring now to FIG. 19, in various embodiments, the motor 10 can be a totally enclosed motor, as described above, wherein the plurality of heat pipes, i.e., heat pipes 700 shown in FIG. 19, can be directly disposed within, and fully enclosed by and sealed within the frame of the motor 10, i.e., frame 704 shown in FIG. 19. More particularly, the structure of the frame 704 includes one or more internal heat pipe chamber(s) 708 in which the plurality of heat pipes 700 are disposed at various locations throughout the frame 704. That is, the internal heat pipe chamber(s) 708 can comprise a single cavity disposed within a substantial portion, or more, of the frame 704 such that a plurality of heat pipes 700 can be disposed and sealed therein such that the heat pipes 700 are not exposed to the environment within the electrical package chamber. Or, the internal heat pipe chamber(s) 708 can comprise a plurality of cavities disposed in various location throughout the frame 704 such that one or more heat pipe 700 is disposed and sealed within each internal heat pipe chamber 708 such that the heat pipes 700 are not exposed to the environment within the electrical package chamber. Generally, during operation, the frame 704 absorbs heat generated by the electrical package, i.e., the stator 12 and rotor 42, which is then removed by the heat pipes 700 disposed within the frame 704, as described below.

The frame 704 defines the cooling and motor portions of the motor 10, respectively identified as CP and MP in FIG. 19. Particularly, the cooling and motor portions CP and MP are both formed by frame 30, but are separated by the structural interface, e.g., the bearing housing 24 disposed within the frame 30. In such embodiments, the motor portion MP of the frame 30 houses the stator 12 and the rotor 42, i.e., the electrical package, and the cooling portion CP of the frame 30 is structured to have a working device, such as a pump or fan, mounted thereto, as described below.

The internal heat pipe chamber(s) 708 are internally disposed within the frame 704 such that each internal heat pipe chamber 708 extends along at least a portion of the length of the motor portion MP (referred to herein as the motor portion of the internal heat pipe chamber) and along at least a portion of the length of the cooling portion CP (referred to herein as the cooling portion of the internal heat pipe chamber). Moreover, each heat pipe 700 is disposed within the internal heat pipe chamber(s) 708 such that the evaporator end of each heat pipe 700 is disposed within the motor portion of the respective internal heat pipe chamber 708, and the condenser end of each heat pipe 700 is disposed within the cooling portion of the respective internal heat pipe chamber 708.

Additionally, as exemplarily illustrated in FIG. 19, in various embodiments, a working device 712 can be coupled to the motor shaft 45 and mounted to a distal end 716 of the cooling portion of the frame 704 such that the working device 712 is driven by the motor 10. Particularly, the working device 712 is mounted to the frame distal ends 716 such that a cooling chamber 720 is formed within the cooling portion CP and an interior chamber 724 of the working device 712, between the bearing housing and a housing 728 of the working device 712.

The working device 712 is structured and operable to pump a high volume of working fluid, or effluent, that is introduced into and circulated through the cooling chamber 720. The working fluid can be any coolant, liquid, fluid, gas or other substance that can be pumped by the pump 712, such as water, oil, air, refrigerant or other coolant. As the working fluid is circulated through the cooling chamber 720, heat is extracted from at least a portion of the frame 704 defining the cooling portion CP which, in turn, extracts heat from the condenser ends of the heat pipes 700, thereby cooling the heat pipe condenser ends. Furthermore, as the heat pipe condenser ends are cooled, heat is extracted from the respective heat pipe evaporator ends, thereby cooling the evaporator ends and the motor portion of the frame 704. Cooling the motor portion of the frame 704 in turn cools the motor portion MP of the motor 10 and the electrical package enclosed therein.

In various embodiments, the working device can comprise a pump and the motor frame 704 can be a submersible motor frame which houses the heat pipes 700 and directly mounts to the pump 712. In such embodiments, the motor 10 comprises a dry-pit submersible where the frame 704 is directly cooled by the pumped effluent, i.e., the working fluid, as described above. Accordingly, in such dry-pit submersible motor embodiments, cooling the dry-pit submersible motor 10 does not require a barrier fluid, circulating internal fluid, external water pumped in and out, etc., to achieve a full dry-pit rating, as do contemporary dry-pit submersible motors. Rather, the heat pipes 700 facilitate moving the heat away from the area of the motor 10 directly behind the stator 12 to the pump mounting end, i.e., the cooling portion CP, of the frame 704 where the heat can be effectively removed via circulation of the effluent through the cooling chamber 720.

Alternatively, in various embodiments, the work device 712 can comprise a cooling system compressor device that is structured and operable to circulate a refrigerant though the cooling chamber 720. For example, the cooling system 600 and compressor device 604 described above with reference to FIG. 18 can be mounted to the frame cooling portion distal 716. Accordingly, the refrigerant, i.e., the working fluid, circulating through the cooling chamber 716, via the compressor device, would cool the frame cooling portion CP, and hence the heat pipe condenser ends, and hence the heat pipe evaporator ends, and hence the electrical package, as described above with reference to FIG. 19.

In other various embodiments, the work device 712 can comprise an air chamber and fan assembly. For example, the air chamber 400 and fan 406 described above with reference to FIGS. 14 and 15 can respectively be mounted to the frame cooling portion distal 716 and shaft 45. Accordingly, air is circulated through the cooling chamber 716, via the fan 406, would cool the frame cooling portion CP, and hence the heat pipe condenser ends, and hence the heat pipe evaporator ends, and hence the electrical package, as described above with reference to FIG. 19.

In still other various embodiments, the work device 712 can comprise coolant chamber and coolant pump. For example, the coolant chamber 500 and pump described above with reference to FIGS. 16 and 17 can respectively be mounted to the frame cooling portion distal 716 and shaft 45. Accordingly, a coolant such as water, i.e., the working fluid, flowing through the cooling chamber 716, via the pump, would cool the frame cooling portion CP, and hence the heat pipe condenser ends, and hence the heat pipe evaporator ends, and hence the electrical package, as described above with reference to FIG. 19.

While not specifically discussed herein, it is further contemplated that in some of the various embodiments described herein, the heat pipes may also be installed into the rotor itself to further assist in heat dissipation and also in the center of the motor shaft to assist in shaft cooling, which would be particularly useful in reducing bearing heat. As discussed above, this would be beneficial to all rotor types and not only to copper bar induction motor rotors.

Also while not specifically discussed herein, it is contemplated that the outer motor housing can implement cooling fins, particularly on the exterior of the chamber, as a particular implementation may require.

Furthermore, while not specifically discussed herein, the present disclosure may be implemented in all types of electric motors. It is therefore not narrowly limited to induction motors or synchronous motors, but may be used in motors of all types (alternating current (synchronous, induction, permanent magnet, etc.) and direct current motors) all motor voltages (low voltage (less than 600 volt), medium voltage (2300/4000/6600 volt) or high voltage (above 6600 volt) can be used with single-phase and three phase motors, all motor enclosures (e.g. totally enclosed fan cooled, totally enclosed submersible, open motors (WPI/WPII), hermetic motors, etc.) all rotor types (fabricated copper bar, fabricated aluminum, die cast aluminum, permanent magnet, wound rotor, etc.), super conducting motors, and motors of constant or variable speed.

Still further, while not specifically discussed herein, it is envisioned that the heat pipes, as described in each of the various embodiments herein, can comprise composite, or multi-section, heat pipes such as those described in pending patent application Ser. No. 12/352,301, filed Jan. 12, 2009 and titled "Composite Heat Pipe Structure", the disclosure of which is incorporated herein in its entirety.

The above examples show that the present disclosure has far ranging application and should not be limited merely to the embodiments shown and described in detail. The specification is provided merely as an example and the scope of the disclosure is not so limited.

What is claimed is:

1. A motor comprising:
a motor portion structured to house a stator and a rotor mounted to a shaft of the motor;
a cooling portion disposed adjacent to the motor portion and separated from the motor portion by a structural interface, the cooling portion providing a cooling chamber and structured to have a cooling fluid moving device coupled thereto and driven by the motor shaft such that the cooling fluid moving device will circulate a cooling fluid intended for use to cool at least one of a discrete object, system and environment that is separate from the motor, the cooling portion further structured to receive at least a portion of the cooling fluid circulated to cool the at least one of a discrete object, system and environment that is separate from the motor; and
a plurality of heat pipes having evaporator ends disposed within the motor portion and condenser ends disposed within the cooling chamber, such that the cooling fluid circulated to cool the at least one of a discrete object, system and environment that is separate from the motor extracts heat from the condenser ends of the heat pipes, thereby cooling the evaporator ends of the heat pipes, thereby cooling the motor portion of the motor and the stator and rotor housed therein.

2. The motor of claim 1, wherein the motor further comprises a frame structured to define the motor portion and the cooling portion and the structural interface is disposed within the motor frame such that the structural interface separates the cooling portion from the motor portion.

3. The motor of claim 1, wherein the cooling fluid comprises a refrigerant and the cooling fluid moving device comprises a cooling system, mounted to an end of the cooling portion opposite the motor portion such that a hermetically sealed cooling chamber is defined between the structural interface and the cooling system, and wherein the motor shaft is structured to be coupled to and drive a compressor of the cooling system which is structured and operable to compress the refrigerant, causing the refrigerant to change from a gaseous phase to a liquid phase, and to generate a flow of the refrigerant that flows through the hermetically sealed cooling chamber such that the liquid phase refrigerant extracts heat from the condenser ends of the heat pipes, thereby cooling the heat pipe evaporator ends, thereby cooling the motor portion of the motor and the rotor and stator housed therein, the refrigerant being prevented by the structural interface from entering the motor portion and contacting the rotor and stator.

4. The motor of claim 1, wherein the cooling fluid comprises air and the cooling fluid moving device comprises a fan mounted to the motor shaft, wherein the cooling portion is structured to provide an air inlet and an air outlet, and to house the fan such that during operation of the motor the shaft driven fan forces a flow of air across the heat pipe condenser ends, thereby extracting heat from the condenser ends of the heat pipes and cooling the evaporator ends of the heat pipes, thereby cooling the motor portion of the motor and the stator and rotor housed therein.

5. The motor of claim 1, wherein the cooling fluid comprises a liquid-based coolant and the cooling fluid moving device comprises a coolant pump, and wherein the cooling portion is structured to provide a coolant inlet and a coolant outlet for a flow of coolant generated by the coolant pump such that the flow of the coolant passes across the heat pipe condenser ends, thereby extracting heat from the condenser ends of the heat pipes and cooling the evaporator ends of the heat pipes, thereby cooling the motor portion of the motor and the stator and rotor housed therein.

6. A method for cooling a motor rotor and stator assembly, said method comprising:
disposing a plurality of heat pipes within a motor such that a condenser end of each heat pipe is disposed within a cooling chamber of the motor and an evaporator end of each heat pipe is disposed within a motor portion of the motor structured to house a stator and a rotor mounted to a shaft of the motor, wherein the motor further includes a cooling portion disposed adjacent to the motor portion and separated from the motor portion by a structural interface thereby defining the cooling chamber within the cooling portion; and
coupling a cooling fluid moving device to the cooling portion, the cooling fluid moving device being structured to be driven by the motor to circulate a cooling fluid intended for use to cool at least one of a discrete object, system and environment that is separate from the motor and to introduce at least a portion of the cooling fluid into the cooling chamber such that the cooling fluid extracts heat from the condenser ends, thereby cooling the evaporator ends of the heat pipes, thereby cooling the motor portion of the motor and the stator and rotor housed therein.

7. The method of claim 6, wherein coupling the cooling fluid moving device the motor cooling portion comprises mounting a cooling system to the motor cooling portion such that a hermetically sealed cooling chamber is defined between the structural interface and the cooling system, whereby the cooling system includes a compressor structured to be driven by the motor to compress a refrigerant, causing the refrigerant to change from a gaseous phase to a liquid phase, and to generate a flow of the refrigerant that flows through the hermetically sealed cooling chamber, thereby extracting heat from the condenser ends of the heat pipes, thereby cooling the heat pipe evaporator ends, thereby cooling the motor portion of the motor and the rotor and stator housed therein, the refrigerant being prevented by the structural interface from entering the motor portion and contacting the rotor and stator.

8. The method of claim 6, wherein coupling the cooling fluid moving device the motor cooling portion comprises mounting a fan to the motor shaft, and wherein the cooling portion is structured to provide an air inlet and an air outlet, and to house the fan such that during operation of the motor the shaft driven fan forces a flow of air across the heat pipe condenser ends, thereby extracting heat from the condenser ends of the heat pipes and cooling the evaporator ends of the heat pipes, thereby cooling the motor portion of the motor and the stator and rotor housed therein.

9. The method of claim 6, wherein coupling the cooling fluid moving device the motor cooling portion comprises fluidly connecting a coolant pump, structured and operable to pump a liquid-based coolant, to the cooling portion, and wherein the cooling portion is structured to provide a coolant inlet and a coolant outlet for a flow of coolant generated by the coolant pump such that the flow of the coolant passes across the heat pipe condenser ends, thereby extracting heat from the condenser ends of the heat pipes and cooling the evaporator ends of the heat pipes, thereby cooling the motor portion of the motor and the stator and rotor housed therein.

10. A motor and cooling fluid moving device assembly comprising:
a motor comprising:
a motor portion structured to house a stator and a rotor mounted to a shaft of the motor;
a cooling portion disposed adjacent to the motor portion and separated from the motor portion by a structural interface to define a cooling chamber within the cooling portion; and
a plurality of heat pipes having evaporator ends disposed within the motor portion and condenser ends disposed within the cooling chamber; and
a cooling fluid moving device mounted to and end of the cooling portion that is opposite the motor chamber, the cooling fluid moving device coupled to the motor shaft such that during operation of the motor the cooling fluid moving device is driven by the motor shaft to circulate a cooling fluid intended for use to cool at least one of a discrete object, system and environment that is separate from the motor and to introduce at least a portion of the cooling fluid into the cooling chamber whereby the cooling fluid circulated to cool the at least one of a discrete object, system and environment that is separate from the motor extracts heat from the condenser ends of the heat pipes, thereby cooling the evaporator ends of the heat pipes, thereby cooling the motor portion of the motor and the stator and rotor housed therein.

11. The assembly of claim 10, wherein the motor further comprises a frame structured to define the motor portion and the cooling portion and the structural interface is disposed within the motor frame such that the structural interface separates the cooling portion from the motor portion.

12. The assembly of claim 10, wherein the cooling fluid comprises a refrigerant and the cooling fluid moving device comprises a compressor, wherein the cooling portion is structured to have a cooling system, including the compressor, mounted to an end of the cooling portion opposite the motor portion such that a hermetically sealed cooling chamber is defined between the structural interface and the cooling system.

13. The assembly of claim 12, wherein the compressor device is coupled to and driven by the motor shaft and structured and operable to compress the refrigerant, causing the refrigerant to change from a gaseous phase to a liquid phase, and to generate a flow of the refrigerant that flows through the hermetically sealed cooling chamber such that the liquid phase refrigerant extracts heat from the condenser ends of the heat pipes, thereby cooling the heat pipe evaporator ends, thereby cooling the motor portion of the motor and the rotor and stator housed therein, the refrigerant being prevented by the structural interface from entering the motor portion and contacting the rotor and stator.

14. The assembly of claim 10, wherein the cooling fluid comprises air and the cooling fluid moving device comprises a fan mounted to the motor shaft, wherein the cooling portion is structured to provide an air inlet and an air outlet, and to house the fan such that during operation of the motor the shaft driven fan forces a flow of air across the heat pipe condenser ends, thereby extracting heat from the condenser ends of the heat pipes and cooling the evaporator ends of the heat pipes, thereby cooling the motor portion of the motor and the stator and rotor housed therein.

15. The assembly of claim 10, wherein the cooling fluid comprises a liquid-based coolant and the cooling fluid moving device comprises a coolant pump fluidly connected to the cooling portion, and wherein the cooling portion is structured to provide a coolant inlet and a coolant outlet for a flow of coolant generated by the coolant pump such that the flow of the coolant passes across the heat pipe condenser ends, thereby extracting heat from the condenser ends of the heat pipes and cooling the evaporator ends of the heat pipes, thereby cooling the motor portion of the motor and the stator and rotor housed therein.

* * * * *